(12) United States Patent
Gelloz et al.

(10) Patent No.: US 6,797,875 B2
(45) Date of Patent: Sep. 28, 2004

(54) GAS-INSULATED MULTI-PHASE LINE, AND A CONNECTION MODULE FOR GOING FROM MULTI-PHASE TO SINGLE-PHASE IN SUCH A LINE

(75) Inventors: Bernard Gelloz, Saint Offenge Dessous (FR); Jean-Michel Berals, Aix les Bains (FR); Christophe Rech, Gresy sur Aix (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/970,679

(22) Filed: Oct. 5, 2001

(65) Prior Publication Data

US 2003/0066669 A1 Apr. 10, 2003

(30) Foreign Application Priority Data

Oct. 9, 2000 (FR) ............................................. 00 12884

(51) Int. Cl.⁷ ................................................ H01B 7/00
(52) U.S. Cl. .................................. 174/25 R; 174/25 G
(58) Field of Search ............................... 174/29, 21 R, 174/21 C, 25 R, 25 G

(56) References Cited

U.S. PATENT DOCUMENTS

| | | | | |
|---|---|---|---|---|
| 3,610,947 A | * | 10/1971 | Stephanides et al. | 307/147 |
| 3,786,170 A | * | 1/1974 | Floessel | 174/28 |
| 3,814,831 A | * | 6/1974 | Olsen | 174/28 |
| 3,864,507 A | * | 2/1975 | Fox et al. | 174/14 R |
| 3,916,081 A | * | 10/1975 | Floessel et al. | 174/28 |
| 3,927,246 A | * | 12/1975 | Tahiliani et al. | 174/19 |
| 4,135,130 A | * | 1/1979 | Wootton | 324/544 |
| 5,089,665 A | * | 2/1992 | Thuries | 174/27 |
| 5,496,965 A | * | 3/1996 | Thuries et al. | 174/24 |
| 5,558,524 A | * | 9/1996 | Classon et al. | 439/92 |
| 5,571,989 A | * | 11/1996 | Thuries et al. | 174/24 |
| 5,571,990 A | * | 11/1996 | Pham et al. | 174/24 |
| 6,002,084 A | * | 12/1999 | Leijon et al. | 174/21 R |
| 6,087,590 A | * | 7/2000 | Meinherz et al. | 174/99 R |
| 6,118,068 A | | 9/2000 | Kelch et al. | |
| 6,281,431 B1 | * | 8/2001 | Cumley | 174/25 G |

FOREIGN PATENT DOCUMENTS

| | | | | |
|---|---|---|---|---|
| DE | 34 14 366 A | | 3/1985 | |
| EP | 0 535 766 A | | 4/1993 | |
| EP | 0 788 208 A | | 8/1997 | |
| FR | 1 225 672 A | * | 1/2001 | H02G/5/06 |
| FR | 2 797 108 | | 2/2001 | |
| WO | WO 97/35371 | | 9/1997 | |

* cited by examiner

Primary Examiner—William H. Mayo, III
(74) Attorney, Agent, or Firm—Sughrue Mion, PLLC

(57) ABSTRACT

The gas-insulated multi-phase line is made up of sections, each of which is formed by metal cladding filled with a dielectric gas under pressure and containing at least three phase conductors disposed in a triangle configuration. Two adjacent sections are connected together via a connection module whose metal cladding is locally made up of a plurality of tubular portions, each of which is filled with dielectric gas and has a single phase conductor passing through it, constituting a passive electrical connection.

19 Claims, 2 Drawing Sheets

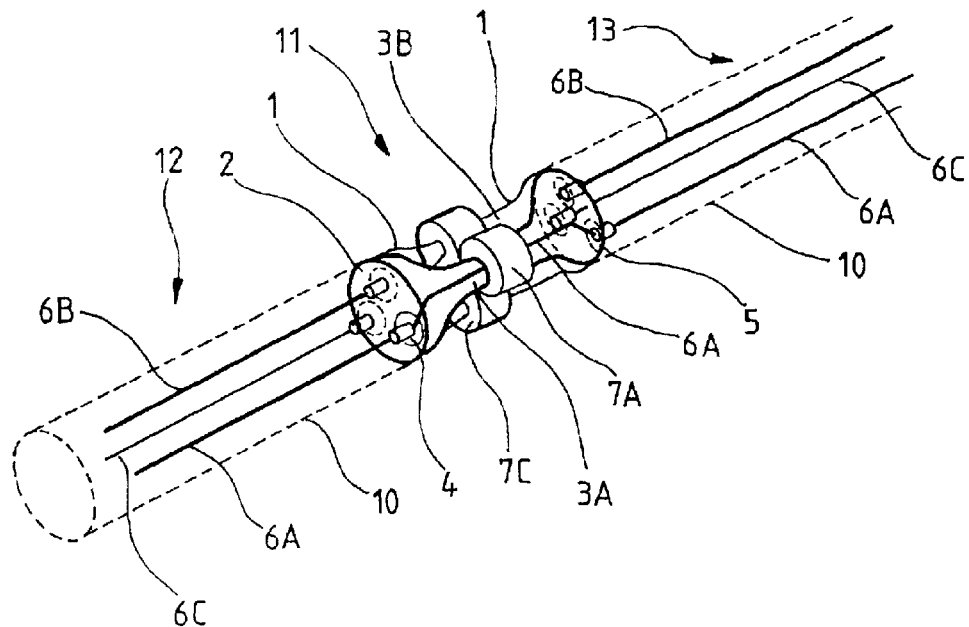
FIG_1
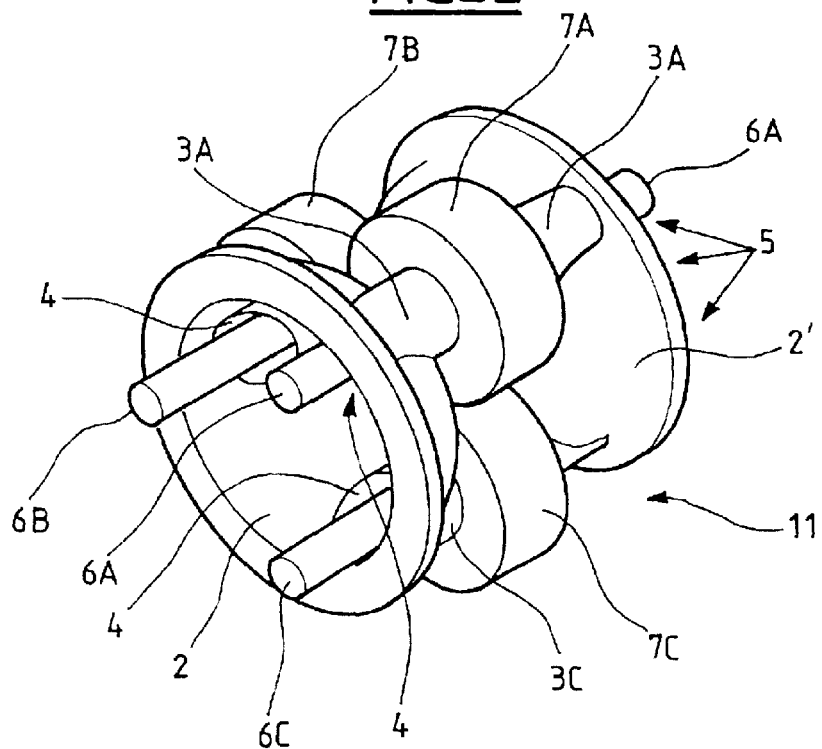
FIG_2

FIG_3
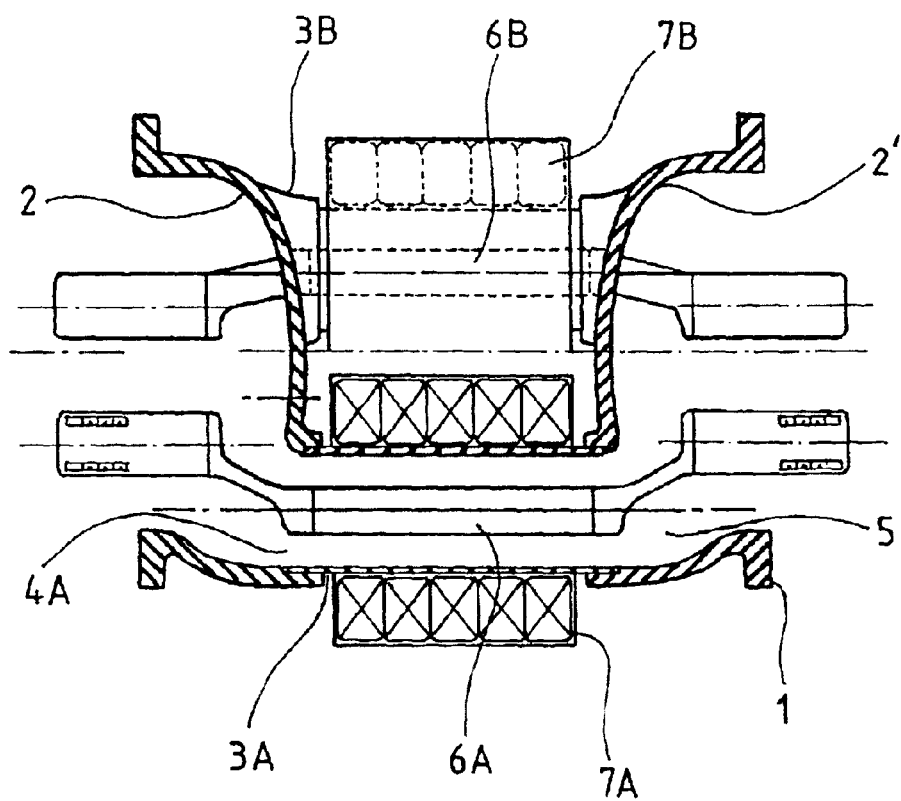

GAS-INSULATED MULTI-PHASE LINE, AND A CONNECTION MODULE FOR GOING FROM MULTI-PHASE TO SINGLE-PHASE IN SUCH A LINE

BACKGROUND OF THE INVENTION

The invention relates to a gas-insulated multi-phase line made up of sections, each of which is formed by metal cladding filled with a dielectric gas under pressure and containing the phase conductors. This type of line must be capable of receiving current-measuring instruments or the like, such as a current transformer. In order to install a multi-phase transformer, it is necessary for the windings that form the secondary of the transformer to be disposed around respective ones of the phase conductors, these conductors being disposed in the same tubular metal cladding filled with an insulation gas under a pressure of a few bars. At present, the windings are mounted inside the metal enclosure of a connection module between two adjacent line sections and they are thus immersed in the dielectric insulation gas. That configuration of windings requires the electrical wires of the secondary to be passed through the metal enclosure of the module via gastight feedthroughs, which is particularly costly to achieve. Since the windings are disposed inside the enclosure, the internal volume of the module must be designed accordingly, which poses problems of resistance to pressure for the enclosure and for the gastight feedthroughs.

SUMMARY OF THE INVENTION

An object of the invention is to mitigate the above-mentioned drawbacks.

To this end, the invention provides a gas-insulated multi-phase line made up of sections, each of which is formed by metal cladding filled with a dielectric gas under pressure and containing at least three phase conductors disposed in a triangle configuration, wherein two adjacent sections are connected together via a connection module whose metal cladding is locally made up of a plurality of tubular portions, each of which is filled with dielectric gas and has a single phase conductor passing through it constituting a passive electrical connection.

With this local structure for the line, it is possible to mount the windings of the secondary of a current transformer in air around the tubular portions, which contributes to reducing significantly the manufacturing cost and the maintenance cost of the current transformer.

The invention also provides a connection module for such a gas-insulated line, as well as a method of assembling such a connection module so that it can receive the secondary windings of a current transformer.

BRIEF DESCRIPTION OF THE DRAWINGS

An embodiment of a gas-insulated multi-phase line of the invention and of the connection module is shown in the drawings, in which:

FIG. 1 is a diagrammatic view showing two adjacent sections of a multi-phase line with a connection module of the invention having a plurality of tubular portions;

FIG. 2 is a diagrammatic perspective view showing the connection module of FIG. 1 as equipped with windings around the tubular portions to constitute a current transformer; and FIG. 3 is a diagrammatic view in longitudinal section showing the connection module of FIG. 2, two out of three phases being shown offset in depth.

DETAILED DESCRIPTION OF THE INVENTION

In FIG. 1, the multi-phase line (which is a three-phase line in this example) is made up of sections 12, 13, each of which is formed by metal cladding 10 filled with a dielectric gas under a pressure of a few bars. The three phase conductors of each section 12 or 13 are immersed in the dielectric gas and are disposed in parallel with one another in an equilateral triangle configuration, in conventional manner. The two adjacent sections 12 and 13 are connected together via a connection module 11 whose metal cladding 1 is locally made up of as many tubular portions as there are phase conductors, and, in the present example, of three tubular portions 3A, 3B, 3C that can be seen in FIG. 2. Each tubular portion is filled with dielectric gas and a single phase conductor 6A, 6B, 6C passes through it so that the module makes it possible to go locally from common cladding for all three phases to three single phases each clad individually.

The invention applies to any multi-phase line having at least three phases. For example, a connection module can have four single-phase cladding portions in a four-phase line of the invention.

As shown in FIG. 2, the connection module 11 is open at both of its ends so that the volumes of the sections 12 and 13 communicate with each other. It is also possible for the module 11 to be closed in gastight manner by one or more insulators at either or both of its ends for the purpose of electrically isolating the two adjacent sections 12, 13 from each other, or of electrically isolating said module from said sections.

As shown in FIGS. 2 and 3, the metal cladding 1 of the module 11 is made up of a first end cap 2 and of a second end cap 2', each of which is dish-shaped and is provided with orifices 4, 5 of aperture determined to enable the phase conductors 6A, 6B, 6C to pass through them with a sufficient isolation distance between each conductor and the cladding 1.

Each of the tubular portions 3A, 3B, 3C of the cladding is formed by a link tube that surrounds an orifice 4 in the first end cap 2 and an orifice in the second end cap 2', the same phase conductor passing through both of these orifices.

The module may be made up of two complementary molded pieces, with one of the two pieces being constituted by an end cap such as 2 extended by the link tubes so as to form a single piece therewith.

The tubular portions 3A, 3B, 3C are preferably mutually parallel, and, in a three-phase configuration, they are preferably disposed in an equilateral triangle configuration so as to make the enclosure 1 as compact as possible. Each of them is surrounded by a determined volume of air, in which it is possible to place a winding 7A, 7B, 7C of the secondary of a current transformer, as shown in FIGS. 2 and 3. Each winding 7A, 7B, 7C thus surrounds a tubular portion 3A, 3B, 3C in air. The connection module of the invention is not exclusively designed for installing current transformers, it is possible for measurement sensors or the like (not shown) to be disposed in air around or in the vicinity of respective ones of the tubular portions 3A, 3B, 3C. If it is not necessary for the sensors to surround the respective phase conductors completely, the tubular portions may be disposed to be touching or almost touching, in order to improve the compactness of the enclosure.

The link tubes may advantageously be separate from and mounted on one of the end caps, and fixed thereto by interfitting and welding, e.g. so as to make it simple to install the windings around the tubes. More particularly, in order to assemble the connection module 11 with secondary windings of a current transformer, firstly each winding is put in place around the respective link tube, and then the two end caps are assembled together via the link tubes so as to form the cladding of the module 11. Then a phase conductor is passed through each link tube.

Naturally, it is possible to consider other embodiments of the module 11 of the invention with link tubes that are cylindrical or otherwise, parallel or otherwise, and of shape more complex than the shape shown in the figures.

What is claimed is:

1. A gas-insulated multi-phase line, comprising:
   a plurality of longitudinal sections, each comprising metal cladding filled with a dielectric gas under pressure and each containing at least three phase conductors;
   wherein said at least three phase conductors are disposed in a triangle configuration; and
   wherein two adjacent longitudinal sections are connected together via a connection module comprising:
      metal cladding forming at least three substantially tubular portions, each tubular portion filled with dielectric gas and each tubular portion having a single one of said at least three phase conductors passing through it.

2. The gas-insulated line of claim 1, wherein said connection module is open at both ends so that the volumes of said longitudinal sections communicate with each other.

3. The gas-insulated line of claim 1, wherein said connection module is closed in a gastight manner by one or more insulators at either or both of its ends so as to isolate two adjacent longitudinal sections from each other, or so as to isolate said module from said longitudinal sections.

4. The gas-insulated line of claim 1, wherein the connection module comprises a first end cap and a second end cap, and
   wherein each of the first end cap and the second end cap surrounds the at least three phase conductors disposed in a triangle configuration.

5. A connection module for a gas-insulated electricity line wherein:
   said connection module has metal cladding made up of a first dish-shaped end cap and of a second dish-shaped end cap,
   which caps are provided with orifices of aperture determined to enable phase conductors to pass through them with a sufficient isolation distance between each conductor and the cladding, and
   in which connection module each of the tubular portions of said cladding of the module is formed of a link tube surrounding an orifice in the first end cap and an orifice in the second end cap, through which orifices the same phase conductor passes.

6. The connection module of claim 5, and in which one end cap is extended by said link tubes thereby forming an integrally-molded single piece therewith.

7. The connection module of claim 5, and in which the tubular portions are mutually parallel.

8. The connection module of claim 7 in which three tubular portions are disposed in an equilateral triangle configuration.

9. The connection module of claim 5, in which each of the tubular portions is surrounded by a determined volume of air.

10. The connection module of claim 5, in which windings forming the secondary of a current transformer are disposed in air around respective ones of said tubular portions.

11. The connection module of claim 10, wherein said windings are formed around said at least three link tubes before said link tubes are connected to said first and second end caps.

12. The connection module of claim 5, in which sensors are disposed in air around or in the vicinity of respective ones of said tubular portions.

13. A connection module for a gas-insulated electricity line, comprising:
   a first dish-shaped end cap having at least three orifices formed therein;
   a second dish-shaped end cap having at least three orifices formed therein; and
   at least three substantially parallel link tubes, each connecting one of said at least three orifices in said first end cap to a corresponding one of said at least three orifices in said second end cap, such that a phase conductor can pass through said one of said orifices in said first end cap, through one of said link tubes, and through said corresponding one of said orifices in said second end cap.

14. The connection module of claim 13, wherein each of said at least three link tubes are joined to one of said orifices in said first end cap, forming an integrally-molded single piece thereby.

15. The connection module of claim 13, wherein said at least three link tubes are disposed in an equilateral triangle configuration.

16. The connection module of claim 13, wherein each of said at least three link tubes is surrounded by a volume of air.

17. The connection module of claim 13, further comprising windings forming a secondary of a current transformer disposed around each of said at least three link tubes.

18. The connection module according to claim 17, wherein said windings are formed around said at least three link tubes before said link tubes are connected to said first and second end caps.

19. The connection module of claim 13, further comprising at least three sensors,
   each disposed substantially in the vicinity of one of said at least three link tubes.

* * * * *